United States Patent [19]

Olson et al.

[11] Patent Number: 5,078,268
[45] Date of Patent: Jan. 7, 1992

[54] PACKAGE FOR VIDEOCASSETTES AND THE LIKE

[75] Inventors: Benjamin E. Olson, South Milwaukee; Elsa M. Keil, West Allis; Richard A. Schmaelzle, Brookfield, all of Wis.

[73] Assignee: PrismaGraphics, Inc., Milwaukee, Wis.

[21] Appl. No.: 573,739

[22] Filed: Aug. 28, 1990

[51] Int. Cl.$^5$ .................. B65D 85/672; B65D 5/42
[52] U.S. Cl. ..................... 206/387; 229/125.28; 229/125.31; 229/23 A
[58] Field of Search ............... 206/491, 387; 229/125.28, 125.31, 23 A

[56] References Cited

U.S. PATENT DOCUMENTS 2,430,609 11/1947 Guyer .................. 229/23 A
3,347,445 10/1967 Wood .................. 229/23 A Primary Examiner—William I. Price
Attorney, Agent, or Firm—Whyte & Hirschboeck

[57] ABSTRACT

A package for mailing or similar rough handling for videocassettes or the like which provides superior cushioning protection and advertising ability, having a pair of opposing main panels, a pair of end panels connected to the edges of the main panels, a pair of side panels connected to the edges of the side and end panels, and a cover flap connected to an edge of a side panel which covers the uppermost main panel and provides a means for securely closing the package. The uppermost main panel contains a rectangular opening circumscribed by downwardly folding flaps which when folded at right angles and received by slots in an internal support and cushioning unit, forms a recessed cavity capable of snugly receiving object(s). The means for securing and closing the package comprises a flap or system of flaps attached to the cover flap which may be inserted into slots on the exterior of the package.

8 Claims, 2 Drawing Sheets

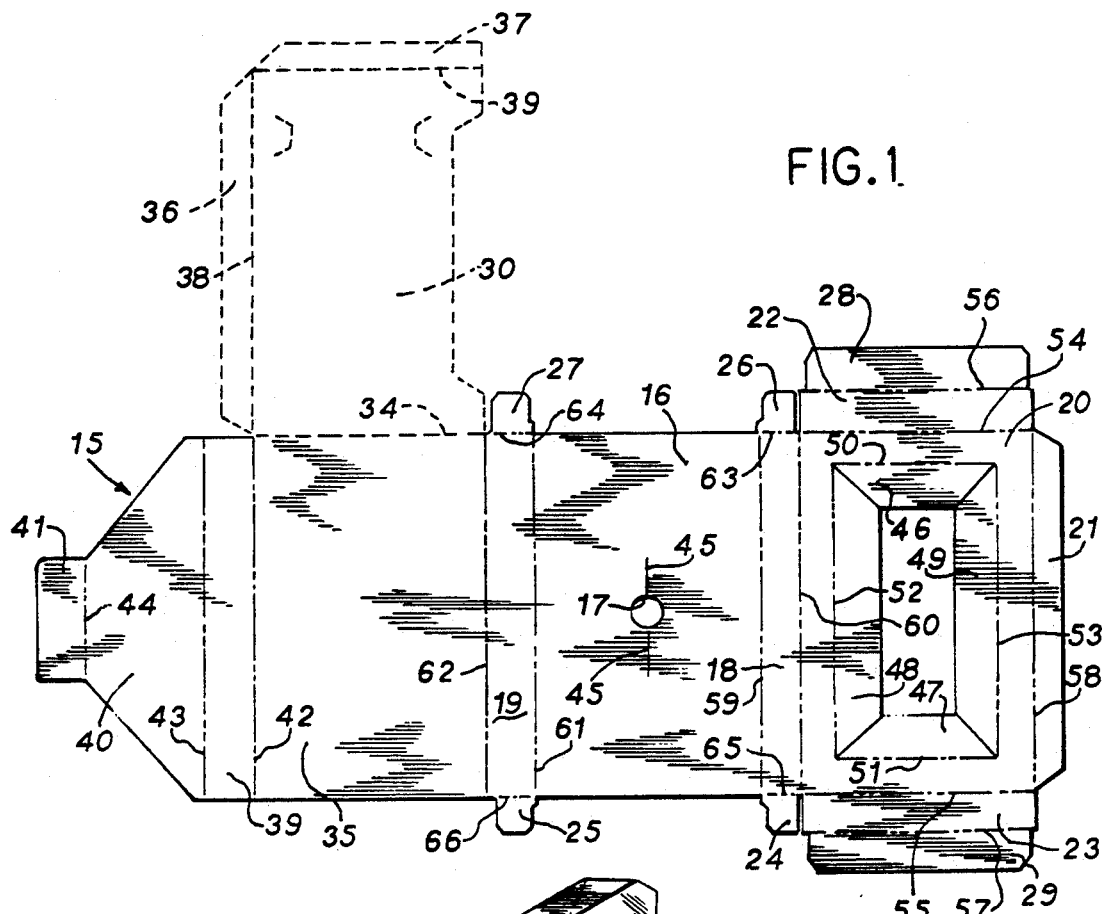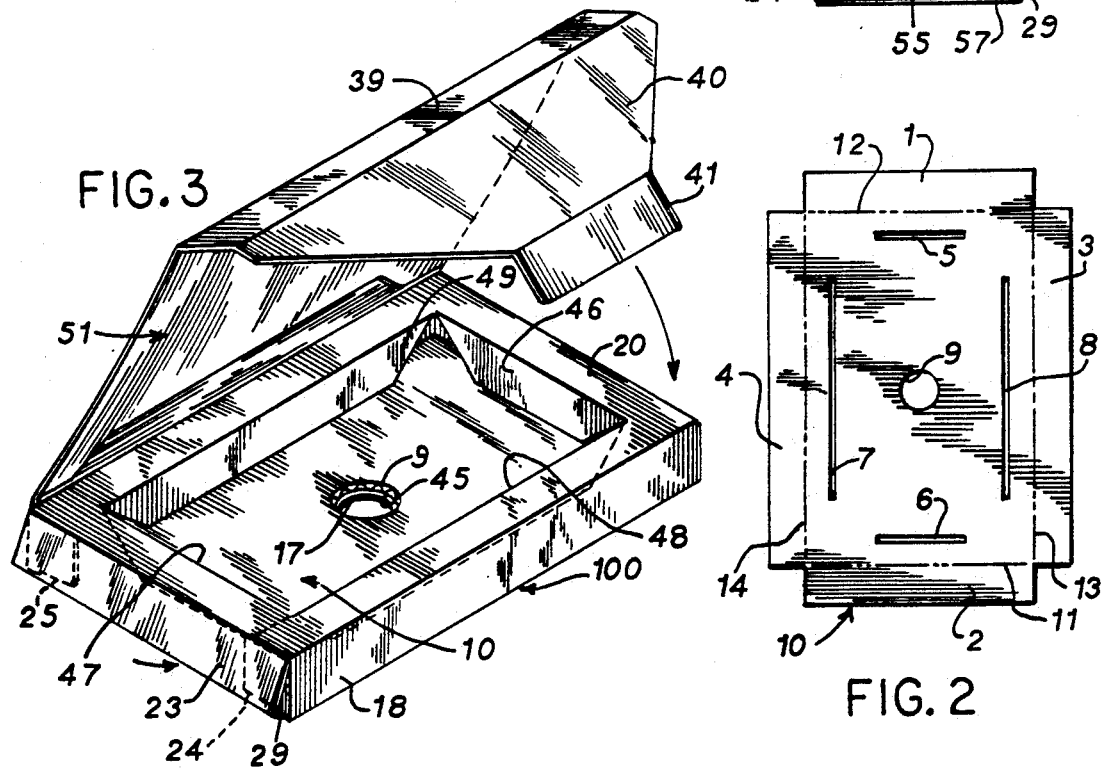

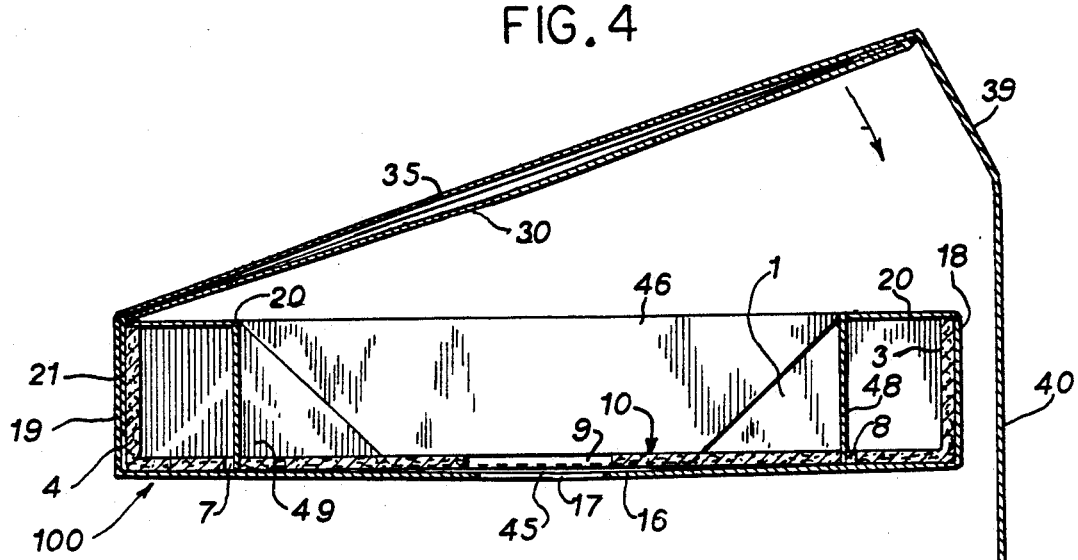
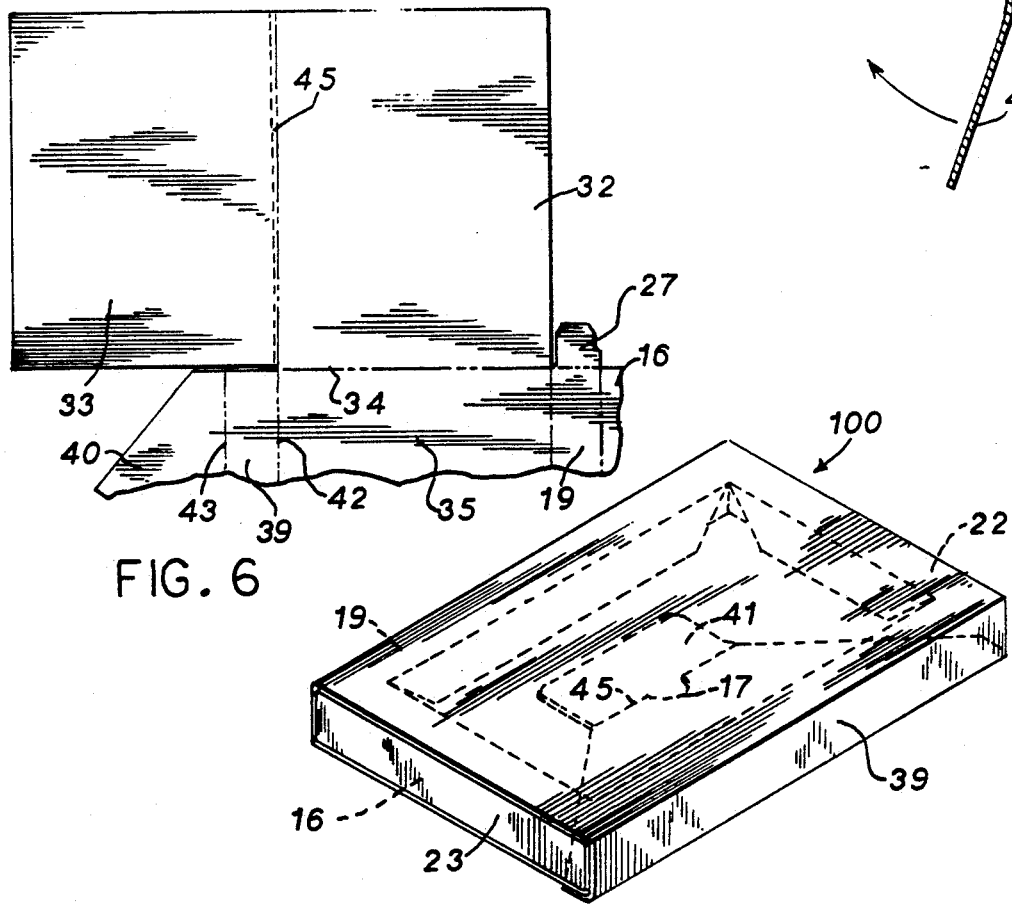

PACKAGE FOR VIDEOCASSETTES AND THE LIKE

BACKGROUND OF THE INVENTION

1. Field of the Invention

This invention relates to containers and in particular to containers for storing or mailing cassette-style recorded information. These containers are also durable, easy to open and close, and are capable of being printed and laminated in a variety of graphics, styles and colors.

2. Background Art

Use of recorded media in cassette form, together with its associated play back or reproduction equipment, is extremely popular. These cassettes are used principally for replay or else they are purchased with pre-recorded programs thereon. It is highly desirable that these cassettes be mailed and stored in protective packages which not only prevent physical damage to the cassettes themselves, but are capable of supportive and assorted graphics and laminations which serve to dress the package and more favorably present its contents.

Previous containers specially adapted for videocassettes, such as Hehn, et. al., U.S. Pat. No. 4,643,301 and Nelson, U.S. Pat. No. 4,678,080 have used molded plastic to fashion containers which provide dust-free storage. These containers, while very durable, have the disadvantage of being bulky, often cumbersome to open, have limited ability to support associated product literature, and provide little cushioning protection in the event of rough handling during mailing.

Hehn provided a pocket molded into the base of the package which could hold advertising or descriptive product information. Previously such booklets were merely Placed inside the container, and were easily lost. Nelson provided an easier to open container by fashioning locking ribs which held an end opening cover rather than a top opening which locked onto its base by locking tabs, such as in Hehn.

Prior paper or cardboard containers either did not completely enclose the product, were not easy to open and close, or consisted of two or more units of differing materials which had to be fastened together. This increased not only raw material cost but assembly time and labor as well. An example of the last category is Ellis, U.S. Pat. No. 4,433,780.

OBJECTS AND SUMMARY OF THE INVENTION

The present invention improves upon prior plastic containers because, being fashioned from paperboard, it is economical and easier to open and close than plastic containers and it affords the possibility to have graphics directly on the surface of the package. The package can also support additional booklets which in combination with the surface graphics ultimately serve to better dress the videocassette or contained object(s) and enhance the quality of its presentation. Additionally, the package provides superior cushioning and dampening protection if dropped or handled roughly as often happens during postal Processing and delivery. To this effect, the interior unit serves at least two functions in providing cushioning protection for the videocassette or stored object(s) as well as support for the exterior cardstock, whereas the exterior unit not only provides an economical means for a pleasing and favorable presentation by limiting printing costs to only one side, but it affords additional Protection for the stored article(s) while maintaining ease and simplicity of use.

The present invention substantially improves upon prior paper containers, such as those like Ellis, because it does not require an additional means for receiving the cassette which must be fastened, preferably by adhesive, to the foldable unit. In the present invention, means for receiving the cassette is fashioned after assembly of the completed package. This design simplifies assembly because said receptacle need not be fastened to the foldable members, eliminating problems associated with joining dissimilar materials such as glue failure or improper positioning during assembly.

Briefly summarized, the invention achieves these and other objectives by providing a container formed from an outer paperboard shell in which one of the panels comprises a recessed cavity which is circumscribed by downwardly folded flaps which are locked into slots in an internal cushioning and supporting unit formed from suitable material such as corrugated cardboard. The Package further comprises a cover that closes the cavity and which can be locked in a closed position using appropriate tabs. This cover may also contain a pocket which when filled with additional material may serve as a means to hold additional product information as well as afford additional cushioning protection over the upper surface of a videocassette or other contained object(s).

DESCRIPTION OF THE DRAWINGS

The invention will be further explained in the following detailed description and with reference to the accompanying drawings, wherein:

FIG. 1 is a top elevational view of the unfolded outer paperboard component of the present invention, FIG. 2 is a top elevational view of an unfolded internal cushioning and supporting component of the present invention, FIG. 3 is a perspective view of a package of the present invention in an open position with the recessed cavity in plain view, FIG. 4 is a cross-sectional view of the present invention taken along line 4—4, FIG. 5 is a perspective view of a package of the present invention in a closed position with hidden lines showing placement of the contents, exterior edges, and positioning of a securing cover flap, and FIGS. 6 is a broken away top elevational view of an alternative of the preferred embodiment showing attachment to securing cover flap.

DESCRIPTION OF THE PREFERRED EMBODIMENTS

A composite package 100 of the present invention comprises an outer paperboard shell 15 and an inner cushioning and supporting component 10 which is preferably formed from corrugated cardboard. The components, shown unfolded in FIGS. 1 and 2 are printed, cut and scored following conventional paperboard converting procedures.

The outer paperboard shell 15 is capable of supporting either single or multiple colored lithography, matte or gloss lamination, matte or gloss varnishes, foil stamping, embossing or any other suitable graphics generating process for said paperboard.

The composite package, shown unfolded in FIGS. 1 and 2, and best seen assembled in FIGS. 3, 4 and 5, has an outer paperboard unit comprising a pair of opposing main panels 20 and 16, a pair of opposing side panels 18 and 19, connected to the side edges of main panels 20 and 16, opposing end panels 22 and 23 connected to the end edges of main panels 20 and 16 and side panels 18 and 19, and a cover panel 35 which is further comprised of locking panels 39 and 40 and locking tab 41 or other suitable locking systems of panels and tabs to securely fasten cover panel 35 over uppermost main panel 20.

The uppermost main panel 20 contains a cutout central portion which is adapted to contain a videocassette or other article(s), the periphery of said cutout portion being bordered by flaps 46, 47, 48 and 49 scored from the edges of upper main panel 20 by lines 50, 51, 52 and 53, respectively, are folded downward, and inserted into slots 5, 6, 8 and 7, respectively, of inner cushioning and supporting unit 10 which holds said flaps in position. The cutout portion is tailored in each case to dimensions that will fit closely around the outside of a specific item such as a videocassette, or around the outside of other articles, either singly or in multiples.

The cushioning and supporting unit 10 rests on top of the lowermost main panel 16, and the four upwardly folding side flaps 1, 2, 3, and 4 of unit 10 lie interior to Panels 22, 23, 18 and 19 of outer unit 15, respectively, and hole 9 of inner unit 10 is aligned with hole 17 of outer paperboard unit. These holes are preferably centrally located in the recessed cavity, but may be alternatively placed anywhere through the underside of said cavity to make possible the removal of contained videocassette or other object(s) from the cavity. (FIG. 3)

Alternatively, the means for facilitating removal of said videocassette or object(s) may be accomplished by cutting an additional tab or tabs into the upper surface panel 20 and through one or more of side surface panels 46-49 which allows leverage to be applied to side & bottom of said videocassette or said object(s).

Package 100 (FIGS. 3, 4, and 5) is assembled by Placing inner cushioning material 10 on the interior side of panel 16 (FIG. 1) of the outer paperboard carton, separated from adjoining panels by score lines 60 and 61, in such a manner as to align openings 9 and 17, and where flaps 3 and 4 are covering panels 18 and 19. Flaps 1-4, formed by score lines 11-14, respectively, are folded at right angles to project upwardly. Panel 20 is folded over cushioning and supporting material 10 so that flaps 3 and 4 are interior to panel 18 and panel 19, which lies inside of flap 21, and flap 1 is interior to flaps 26 and 27 and flap 2 is interior to flaps 24 and 25. Flap 21 is connected to panel 20 by score line 58. Panel 18 is connected to panels 16 and 20 by score lines 59 and 60, respectively. Panel 19 attaches panels 17 and 35 by score lines 61 and 62, respectively. Flap 21 is secured to panel 19 by any suitable means, such as adhesive (not shown). Panels 22 and 23, connected to panel 20 by score lines 54 and 55, respectively, are folded at right angles to surface of panel 20. Flaps 28 and 29, attached to panels 22 and 23 by score lines 56 and 57, all respectively, are folded perpendicularly to same and are inserted into the partially assembled package so as to lie beneath inner unit 10 but above panel 16, and such that Panels 22 and 23 form exterior surfaces of end panels (FIGS. 3, 4 and 5).

Interior panels 46, 47, 48 and 49, separated from each other by diagonal cuts and connected to panel 20 by score lines 50, 51, 52, and 53, respectively, are folded at right angles to same to fold downward into slots 5, 6, 8 and 7, respectively, to form interior walls of recessed cavity (FIG. 3).

Panel 30 of FIG. 1, is attached to panel 35 by score line 34. Alternatively to the preferred embodiment, Panel 30 may be deleted entirely, with the resulting cover flap comprising a simple layer over the upper surface of the videocassette or other stored object(s).

Flaps 36 and 37, separated from panel 30 by score lines 38 and 39, are fastened by any suitable means, preferably by adhesive, to panel 35 to form pocket 51 of FIG. 3. Pocket 51 facilitates storage of additional product information, and provides additional cushioning protection for upper surface of contained videocassette or article(s). Such cushioning protection is provided both by the material forming the pocket and also the contents of the pocket which may be in the form of pamphlets or a booklet. Thus, while the upper surface of the cassette is not protected by cushioning unit 10, such cushioning protection is provided by pocket 51 and its contents.

Alternatively, panel 30 and flap 36 and 37 may be substituted by a panel of similar dimensions as panel 35 (not shown), connected to same by a similar score line as line 34, and when folded and fastened over panel 35 allows graphics and/or printed matter to be displayed on interior surface of cover flap without incurring the expense of double sided printing. Additionally, such a panel would provide additional protection for upper surface of a videocassette or like object(s) contained in the package.

A further alternative embodiment, shown in FIG. 6, depicts panel 32, separated from panel 35 by score line 34, fastened in a similar manner for a similar purpose as the preceding alternative. This embodiment, however, also comprises panel 33, separated from panel 32 by perforations 45, which facilitate removal of panel 33. Panel 33 may be thus used for reply correspondence from the recipient of the videocassette or object(s) or for similar purposes.

Panel 39, attached to panel 35 in any one of the above embodiments by score line 42, is folded over the recessed cavity and becomes the exterior surface of one side panel (FIGS. 3, 4 and 5).

Panel 40, attached to panel 39 by score line 43, folds over panel 16, the lowermost main panel, where flap 41, which is connected to panel 40 by score line 44, may be inserted into slot 45 which locks panels 35, 39 and 40 in a closed position and which covers holes 9 and 17 to protect the underside of the videocassette or object(s) in the recessed cavity.

Panels 39 and 40 and flap 41 may be substituted by a suitable alternative flap or system of flaps, for example, locking into a slot on one of the edge panel score lines, so as to provide a suitable means for locking panel 35 over the top of the recessed cavity.

As shown in the drawings, cushioning and supporting unit 10 is preferably of dimensions such that, when folded, it fits closely within the outer paperboard component of the container, and thus reinforces the bottom, sides and ends of the package. As previously noted, unit 10 is preferably formed from corrugated cardboard, but could alternatively be a sheet of plastic foam or low density pressed Paper such as the material commonly used to manufacture egg cartons.

What is claimed is:

1. A package for videocassette(s) or the like capable of enclosing and cushioning the contents during mailing or similar rough handling and capable of being Printed with a variety of graphics, comprising an outer Paperboard carton including a pair of opposed main panels, a pair of opposed side panels connected to the side edges of said main panels, opposed end panels connected to the end edges of the main and side panels, and a cover panel hinged to the edge of one of said side panels and adapted to cover the uppermost of said main panels, said uppermost main panel having a cutout central portion adapted to contain a videocassette, an article or articles, the Periphery of said cutout portion being bordered by flaps scored from the edges of said upper panel on each side of said cutout portion and folded downwardly at right angles to said uppermost panel to form a recessed cavity, and a cushioning and supporting member contained within said package and covering the majority of the area of the lowermost panel and having upwardly folded side flaps on each of its sides positioned inside said package adjacent to each of said side panels and end panels, said cushioning and supporting member being formed of light weight cushioning material having rigidity greater than said paperboard, and further having slots aligned with said downwardly folded flaps, each of said flaps being contained within such slot to hold it in position, said cover panel being adapted to cover said cutout portion and being provided with a means to lock the same in a closed position.

2. The package of claim 1 wherein said cover panel has an additional panel hinged to one side edge of same, which when folded and fastened back onto same allows exterior graphics to be present on underside of said cover panel.

3. The package of claim 2, wherein said additional panel has another panel attached by perforations thereto which may be separated easily.

4. The package of claim 1 wherein said cover panel has an additional panel hinged to one side edge thereof, which itself has flaps hinged to two edges, which after folding may be adhered to said cover panel to form a pocket on the underside thereof, where said pocket Provides means for storing printed materials, whereby said pocket and its contents provide cushioning protection for the top of the contents of said package.

5. The package of claim 1 wherein said cushioning material is comprised of corrugated cardboard which is of dimensions to closely fit within the interior of said outer paperboard carton.

6. The package of claim 1 wherein said outer paperboard carton comprises a cardstock material capable of both rigidity and bendability which also is capable of single or multiple colored lithography, matte or gloss lamination, matte or gloss varnishes, foil stamping embossing or other suitable graphics generating process for said cardstock.

7. A protective package containing at least one object for storage or mailing comprising two nested together units, the innermost unit being formed of a low density cushioning material having a plurality of slots therein, around which is folded an outer paperboard container unit; said units further comprising a recessed pocket formed in a surface of said paperboard in which the object is contained, said pocket having side walls formed of hinged flaps cut from said surface and folded at right angles thereto, each flap fitting into one of said slots, and a hinged cover on said outer unit adapted to cover said pocket and having a flap engaging a slot in the surface of said outer unit to secure said cover in a closed position, the outer unit of which comprises said Pocket also comprises opposing end and side panels formed by additional flaps on same, said side panels formed by bending said flaps at right angles, with side panel hinged to said cover being formed by tenaciously bonding one of said flaps which forms external walls of said pocket, said end panels formed by folding remainder of said flaps at right angles and inserting inside of said external walls, in such a manner as to eliminate the need for additional bonding means.

8. A package according to claim 7 which attractively dresses the contained object and furnishes means for presenting additional product information which is printed on additional enclosures.

* * * * *